United States Patent [19]

Kobayashi

[11] Patent Number: 5,637,163

[45] Date of Patent: Jun. 10, 1997

[54] HEAVY DUTY PNEUMATIC RADIAL TIRES WITH STEEL CORD BELT LAYERS

[75] Inventor: Yasuhiko Kobayashi, Kodaira, Japan

[73] Assignee: Bridgestone Corporation, Tokyo, Japan

[21] Appl. No.: 510,624

[22] Filed: Aug. 3, 1995

[30] Foreign Application Priority Data

Aug. 25, 1994 [JP] Japan ................... 6-200847

[51] Int. Cl.⁶ .................... B60C 9/18; B60C 9/20
[52] U.S. Cl. ............... 152/534; 152/526; 152/527; 152/535; 152/538
[58] Field of Search ............... 152/526, 538, 152/534–535, 527

[56] References Cited

U.S. PATENT DOCUMENTS 5,027,877  7/1991  Tamura et al. .

FOREIGN PATENT DOCUMENTS

| 0 557 101 | 8/1993  | European Pat. Off. . |
| 2388685   | 11/1978 | France . |
| 2389503   | 12/1978 | France . |
| 2072590   | 10/1981 | United Kingdom . |

*Primary Examiner*—Adrienne C. Johnstone
*Attorney, Agent, or Firm*—Sughrue, Mion, Zinn, Macpeak & Seas

[57] ABSTRACT

In a heavy duty pneumatic radial tire, when the belt is comprised of not less than three main belt layers, a belt layer other than a belt layer adjacent to a carcass is a narrow-width rigidity reinforcing layer, or when the belt is comprised of not less than four main belt layers, a belt layer adjacent to the carcass and a belt layer other than a belt layer adjacent to the belt layer are narrow-width rigidity reinforcing layers. Such a narrow-width rigidity reinforcing layer has given width and inclination cord angle.

6 Claims, 5 Drawing Sheets

FIG_1a
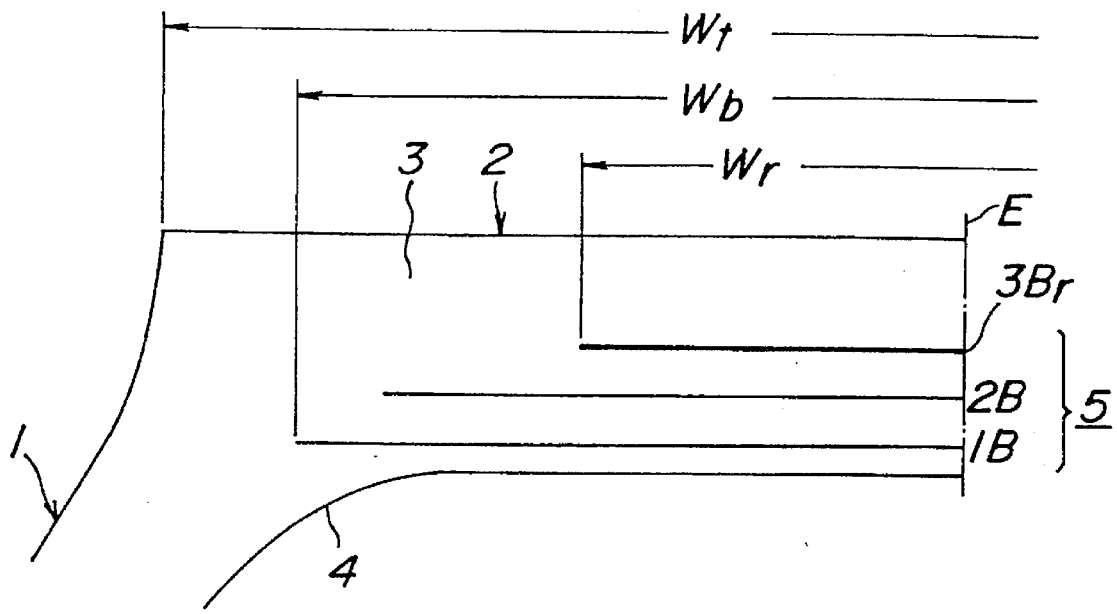
FIG_1b
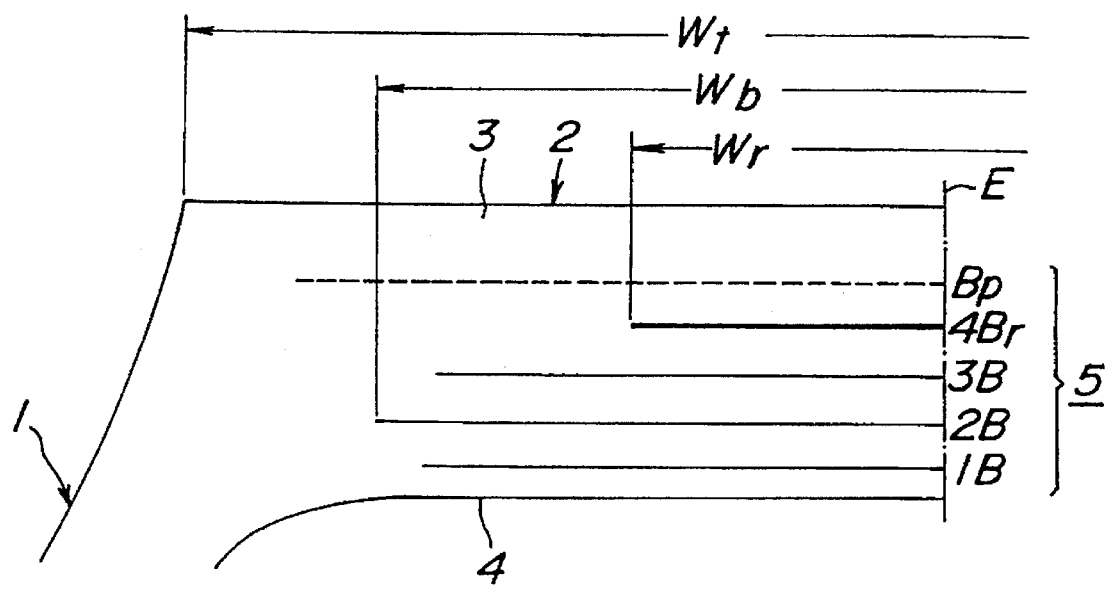

FIG_2a
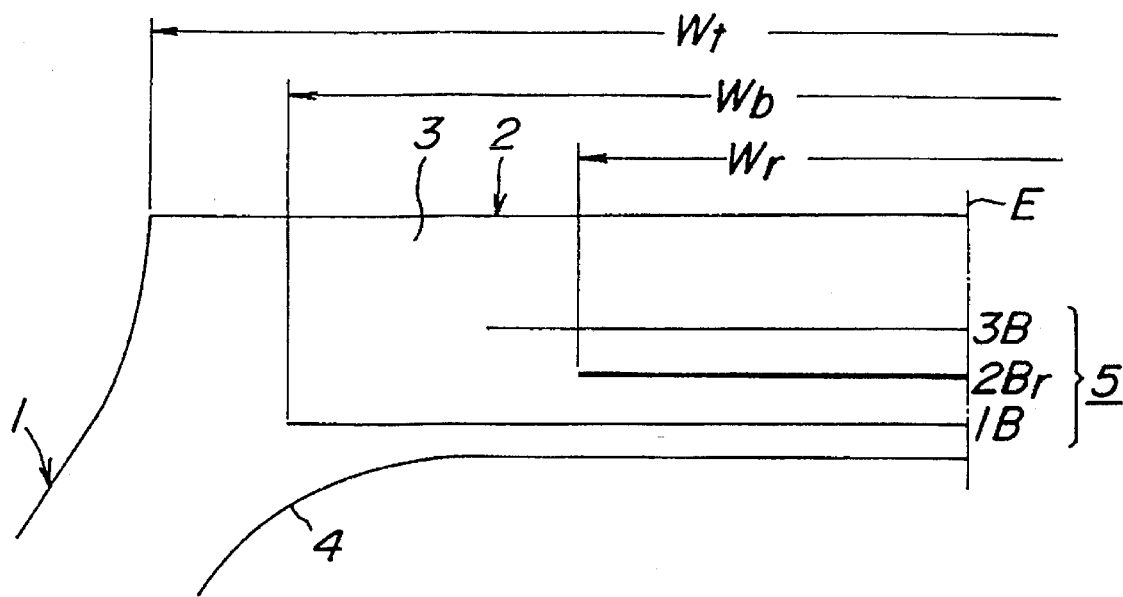
FIG_2b
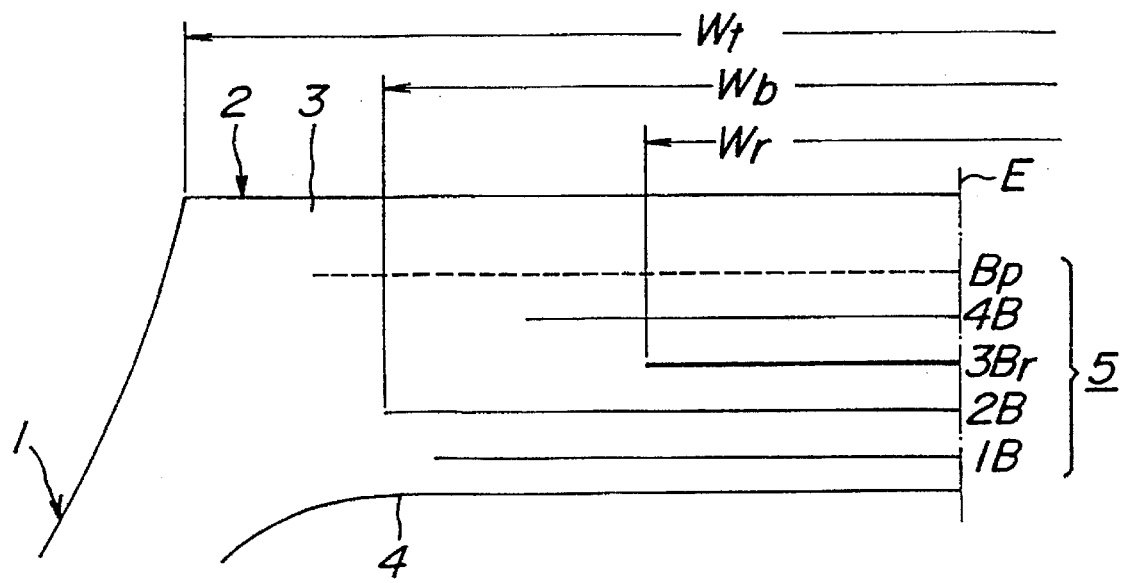

FIG_3a
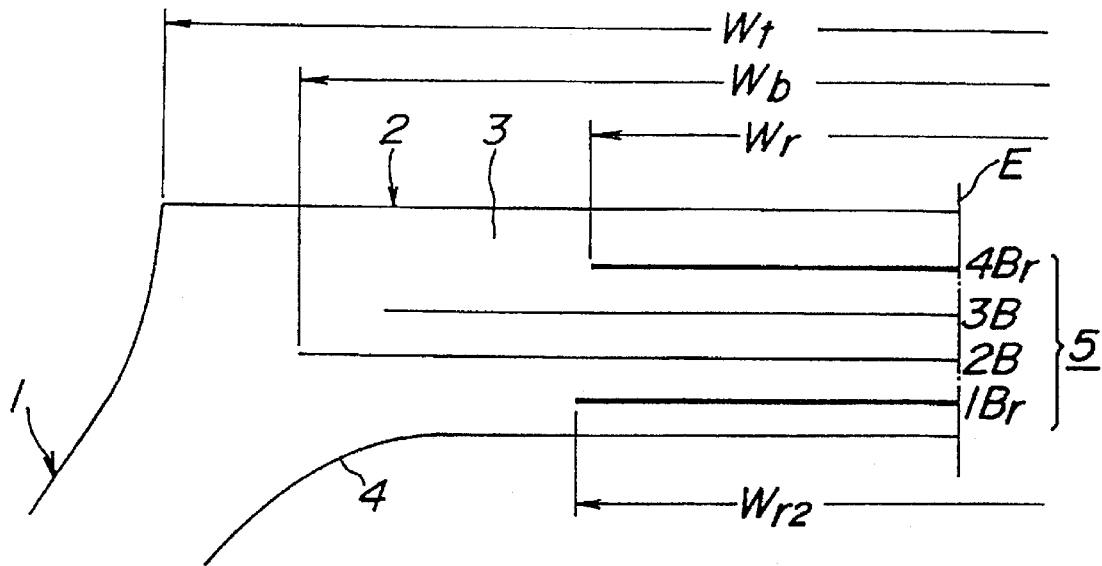
FIG_3b
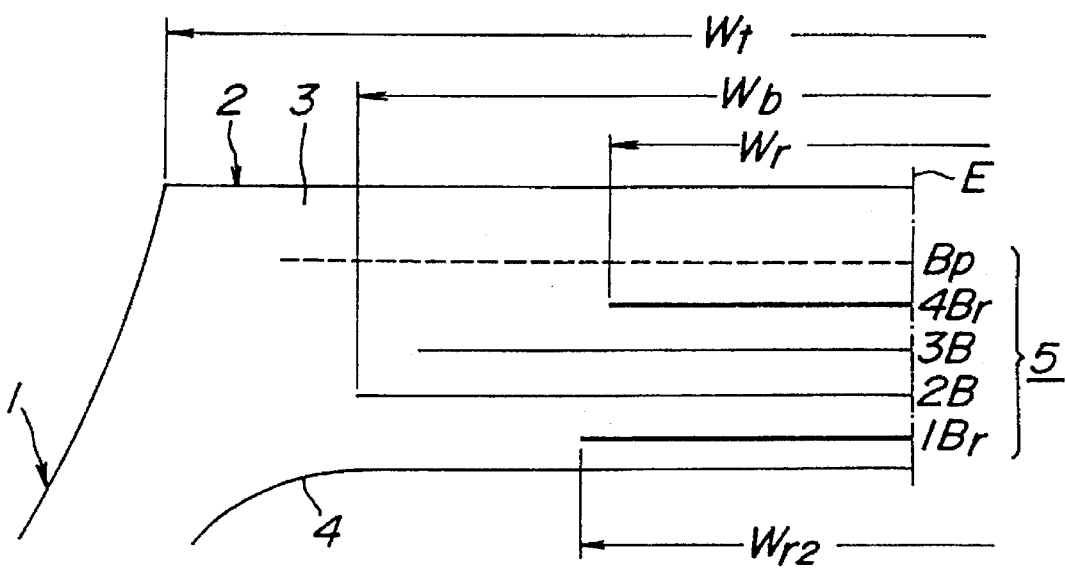

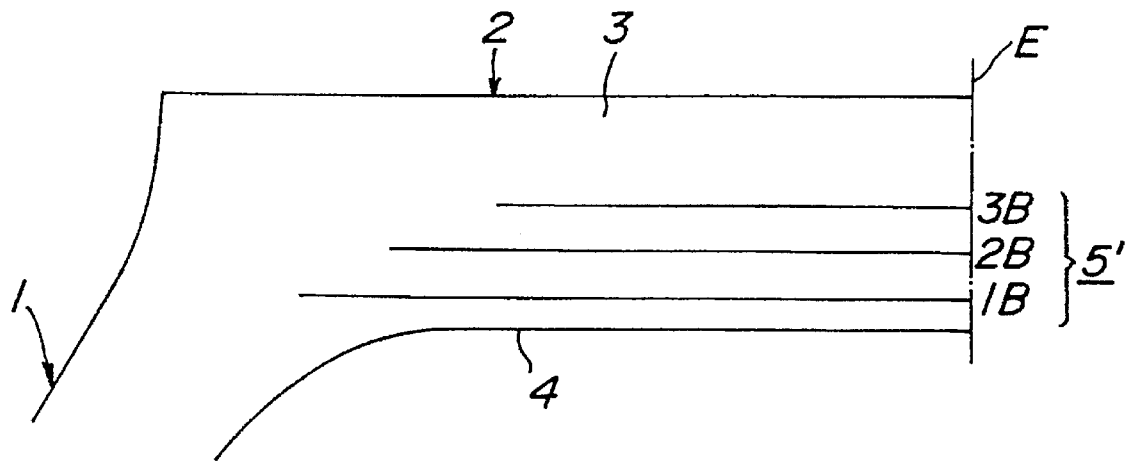
FIG_4a
*PRIOR ART*
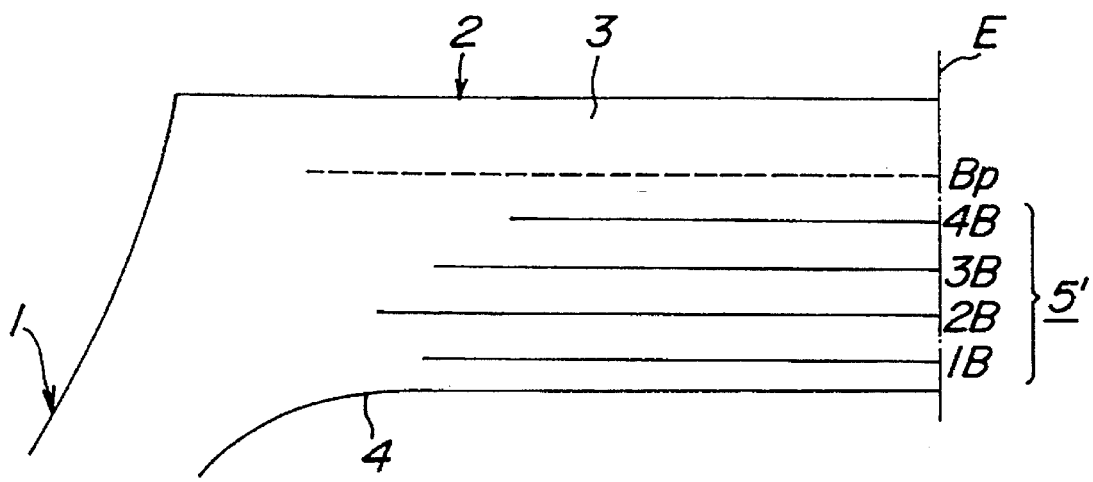
FIG_4b
*PRIOR ART*

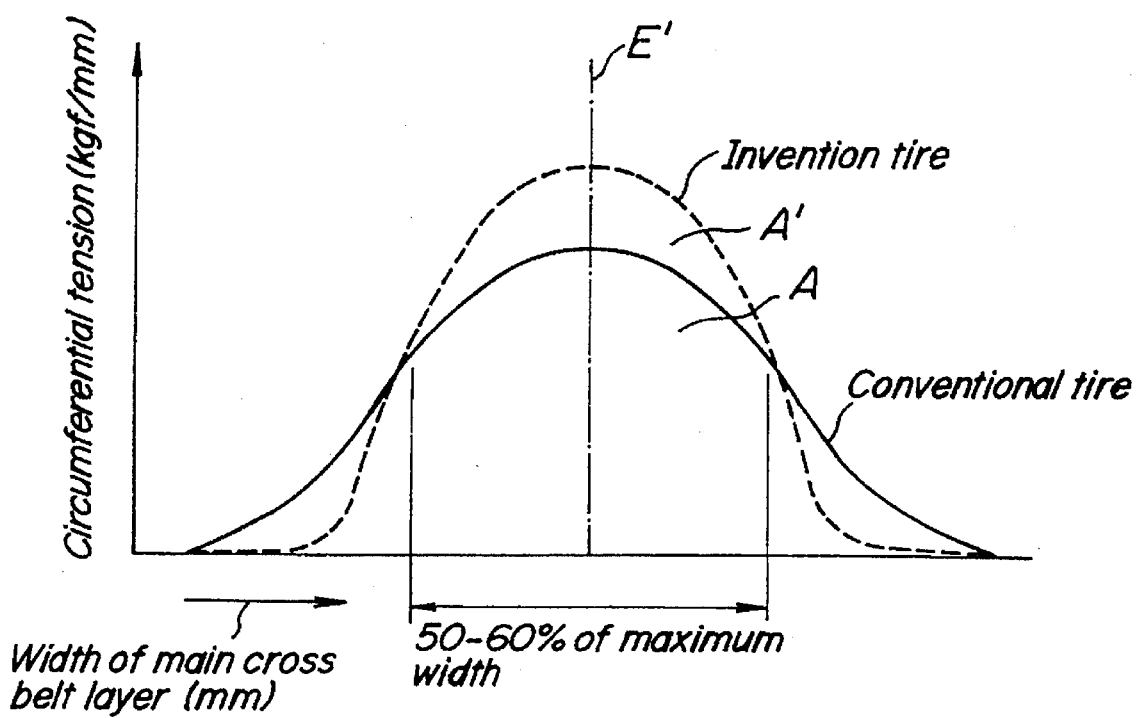
FIG_5

HEAVY DUTY PNEUMATIC RADIAL TIRES WITH STEEL CORD BELT LAYERS

BACKGROUND OF THE INVENTION

1. Field of the Invention

This invention relates to a heavy duty pneumatic radial tire having an improved belt durability more particularly it relates to a heavy duty pneumatic radial tire capable of advantageously attaining resistance to cut separation and resistance to cut penetration in a tread portion.

2. Description of the Related Art

When tires for heavy duty vehicles are run on roads partially including rough road, bad road or roads scattered with foreign objects, they are subjected to the potential of deep cut damage in an outer portion of the tread or tread rubber. The conditions also tend to cause a trouble known as cut separation failure. The term "cut separation failure" used herein means a problem when the tire is subjected to deep cut damage arriving at the belt located in a central region of the tread portion and grows to separation from the cut damaged portion along the outer peripheral surface of the belt during the running of the tire.

Cut separation failure results from the action of shearing strain produced between the outer peripheral surface of the belt and the tread rubber contacting therewith accompanied with the bending deformation behavior of the belt in the peripheral direction of the tread (hereinafter referred to as the circumferential direction) at stepping-in side and kicking-out side of the tread portion during running of the tire. Since the cut separation failure is created between the tread rubber and the outer peripheral surface of the belt, it is a serious problem because the tire is removed from the vehicle at a time when the separation region is remarkably enlarged or tread rubber is sometimes peeled off at the separation region.

To this end, it has been attempted to enhance the bending rigidity of the belt in the circumferential direction for controlling the shearing strain as far as possible. In fact, it is attempted to make an inclination angle of cords, particularly steel cords in the belt with respect to the circumferential direction small as far as possible.

However, the above attempt does not particularly exhibit the remarkable improving effect on the resistance to cut separation. This is because, another separation failure is apt to be caused at the end of the belt as the inclination cord angle becomes smaller. Considering this fact, making the inclination cord angle small to improve the bending rigidity of the belt in the circumferential direction is naturally critical and hence it is difficult to develop the expected excellent resistance to cut separation.

Furthermore, when the inclination cord angle is made small to enhance the bending rigidity of the belt as a whole, an enveloping property (EP) in the riding of the tread portion over projections such as rock or stone or EP property against projections is deteriorated. A chance of subjecting the tread portion to cut damage increases but also the cut depth becomes deeper, which sometimes brings about a fatal failure of passing the cut damage through the entire tread portion or so-called cut penetration failure.

SUMMARY OF THE INVENTION

It is, therefore, an object of the invention to provide a heavy duty pneumatic radial tire possessing excellent resistance to cut separation and sufficient resistance to cut penetration while sufficiently maintaining the separation resistance at the end of the belt.

According to a first aspect of the invention, there is the provision of a heavy duty pneumatic radial tire comprising a radial carcass extending between a pair of bead cores for reinforcing sidewall portions and a tread portion, and a belt reinforcing the tread portion at an outside of the carcass and comprised of plural steel cord layers, in which said belt is comprised of not less than three main cross belt layers, steel cords of which layers being crossed with each other between adjacent belt layers. A maximum width in the main cross belt layers is within a range of 70–85% of a tread width of the tread portion. A remaining belt layer other than a belt layer adjacent to the carcass among the above main cross belt layers is a narrow-width rigidity reinforcing layer having a width corresponding to 50–60% of the maximum width of the main belt layer and an inclination cord angle of 5°–15° with respect to an equatorial plane of the tire.

According to a second aspect of the invention, there is the provision of a heavy duty pneumatic radial tire comprising a radial carcass extending between a pair of bead cores for reinforcing sidewall portions and a tread portion, and a belt reinforcing the tread portion at an outside of the carcass and comprised of plural steel cord layers, in which the belt is comprised of not less than four main cross belt layers, steel cords of which layers being crossed with each other between adjacent belt layers. A maximum width in the main cross belt layers is within a range of 70–85% of a tread width of the tread portion. Each one of a belt layer adjacent to the carcass and a remaining belt layer other than a belt layer facing to the belt layer adjacent to the carcass among the above main cross belt layers is a narrow-width rigidity reinforcing layer having a width corresponding to 50–60% of the maximum width of the main belt layer and an inclination cord angle of 5°–15° with respect to an equatorial plane of the tire.

BRIEF DESCRIPTION OF THE DRAWINGS

The invention will be described with reference to the accompanying drawings, wherein:

FIGS. 1a and 1b and FIGS. 2a and 2b are schematically cross sectional views of main parts of various embodiments of the heavy duty pneumatic radial tire according to a first aspect of the invention, respectively;

FIGS. 3a and 3b are schematically sectional views of main parts of various embodiments of the heavy duty pneumatic radial tire according to a second aspect of the invention, respectively;

FIGS. 4a and 4b are schematically cross sectional views of main parts of the conventional heavy duty pneumatic radial tires; and FIG. 5 is a graph showing a distribution of circumferential tension in a widthwise direction of a main cross belt layer.

DESCRIPTION OF THE PREFERRED EMBODIMENTS

In FIGS. 1a to 3b are schematically and in cross-section main parts of various embodiments of the heavy duty pneumatic radial tire according to the invention in a left-half section of the tire. The embodiments of the tire according to the first aspect of the invention are shown in FIGS. 1a to 2b and the embodiments of the tire according to the second aspect of the invention are shown in FIGS. 3a and 3b. Moreover, each of these tires is symmetric with respect to an equatorial plane of the tire. In these figures, numeral 1 is a sidewall portion, numeral 2 a tread portion, numeral 3 a tread rubber, numeral 4 a carcass and numeral 5 a belt. The carcass 4 is a radial rubberized cord ply extending between a pair of bead cores (not shown) for reinforcing the sidewall portion 1 and the tread portion 2, and the belt 5 is a laminate of plural steel cord layers.

The belt 5 shown in FIGS. 1a and 2a is comprised of three main cross belt layers 1B, 2B and 3B. The belt 5 shown in FIG. 3a is comprised of four main cross belt layers 1B, 2B, 3B and 4B. The belt 5 shown in FIGS. 1b, 2b and 3b is comprised of four main cross belt layers 1B, 2B, 3B and 4B and a protection belt layer Bp. Moreover, the main cross belt layers are represented by appending symbol B as a belt layer with numerals 1–4 for first to fourth layers gradually arranged outward from a position adjacent to the carcass in the radial direction of the tire (except for the narrow-width rigidity reinforcing layer). The cords of the main cross belt layers 1B–3B or 1B–4B are crossed with each other between the adjacent layers, i.e. between 1B and 2B, between 2B and 3B, and between 3B and 4b with respect to the equatorial plane. When a width of the tread portion 2 is Wt and a maximum width in the main cross belt layers is Wb, the maximum width Wb is within a range of 70–85% of the tread width Wt.

The narrow-width rigidity reinforcing layer according to the invention is shown by a bold solid line in each of FIGS. 1a to 3b and represented as Br appended with symbol r. According to the first aspect of the invention, the narrow-width rigidity reinforcing layer is applied to a remaining belt layer other than a belt layer 1B adjacent to the carcass 4 among the main cross belt layers and corresponds to a belt layer 3Br in FIGS. 1a and 2b, a belt layer 4Br in FIG. 1b, and a belt layer 2Br in FIG. 2a. According to the second aspect of the invention, the narrow-width rigidity reinforcing layer corresponds to a belt layer 1Br adjacent to the carcass 4 and a remaining belt layer (4Br in the illustrated embodiment) other than a belt layer 2B adjacent to the belt layer 1Br as shown in FIGS. 3a and 3b. Of course, the narrow-width rigidity reinforcing layer Br in the first aspect of the invention may be applied to any belt layer other than the belt layer 1B when the belt is comprised of not less than three belt layers. The narrow-width rigidity reinforcing layer Br near the tread in the second aspect of the invention may be applied to any belt layer B located near the tread.

In the figures, the width of the narrow-width rigidity reinforcing layer Br is represented by Wr, which is within a range of 50–60% of the maximum width Wb. The cords in the narrow-width rigidity reinforcing layer Br are arranged at an inclination cord angle of 5°–15° with respect to an equatorial plane E of the tire. Moreover, it is desirable that the belt layers B other than the belt layer Br have an inclination cord angle of 18°–35° with respect to the equatorial plane E. As a result, the cords of the belt layer Br bear a considerably large tension during inflation under internal pressure, so that the steel cord used in the belt layer Br is desirable to have a diameter larger than that of the other belt layers B or a tensile strength higher than that of the belt layers B.

Since the arrangement of the protection belt layer Bp is to protect the main cross belt layers from cutting, it is desirable that a rubberized layer of so-called high elongation steel cords as the protection belt layer Bp is arranged on the outer peripheral side of the main cross belt layer.

As a result of various studies, it has been elucidated that the cut separation failure grows from cut damage generated in the tread portion 2, particularly the central region thereof. Therefore, it has been clarified that the occurrence of cut separation failure can be effectively controlled by reducing the aforementioned shearing strain in the central region or enhancing the bending rigidity of the belt 5 at the central region in the circumferential direction.

On the other hand, the magnification of bending rigidity of the belt 5 in the circumferential direction depends on the effect of laminating the belt layers as the belt 5 and is considerably dependent upon the degree of circumferential tension produced in the belt at the time of tire inflation inflating under internal pressure. From this fact, it has been confirmed that the bending rigidity at the central region of the tread portion 2 may be enhanced by increasing the tension of the belt 5 at the central region at the time of inflation.

As a result of further studies, it has been found that the value of the shearing strain produced in the central region of the tread portion 2 is dependent upon the value of circumferential tension acting on the central region of the main cross belt layer having a width corresponding to 50–60% of the maximum width Wb of the main cross belt layer in the belt 5, or the value of the shearing strain can be decreased by increasing the value of the circumferential tension.

The distribution of the circumferential tension acting on the belt 5 during inflation of the tire under internal pressure indicates a parabolic curve in which a maximum value is existent at a widthwise center position E' of the belt 5 (substantially the same as the equatorial plane E of the tire) as shown in FIG. 5. In FIG. 5, a solid line is the distribution of the conventional tire, and dotted lines are the distribution of an embodiment of the tire according to the invention. As a result of examining the sum of circumferential tension (areas A, A' defined between axis of abscissa and curved line), it has been confirmed that the sum of circumferential tension is substantially constant even when the structure of the belt layers as the belt 5 is changed. For example, the inclination cord angle with respect to the equatorial plane E is changed (i.e. area A≡area A') and a large change in the distribution curve of circumferential tension is not observed even when the inclination cord angle in each belt layer is made small.

According to the first aspect of the invention, when the belt is comprised of main cross belt layers 1B–3B or 1B–4B having a width corresponding to 70–85% of the tread width Wt and a belt layer other than the belt layer 1B among these main cross belt layers is a narrow-width rigidity reinforcing layer Br having a width Wr corresponding to 50–60% of the maximum width Wb of the main cross belt layer and an inclination cord angle of 5°–15° with respect to the equatorial plane E (see FIGS. 1 and 2), it is possible to change the distribution of circumferential tension in the belt 5 into a curve shown by dotted lines in FIG. 5. As a result the circumferential tension is considerably protruded at a central portion in the widthwise direction. This is due to the fact that the bearing of circumferential tension by the narrow-width rigidity reinforcing layer Br becomes considerably large compared with those of the main cross belt layers B other than the layer Br.

Thus, the circumferential tension acting on the belt 5 can be concentrically born by the central region of the belt 5, so that the bending deformation at the central region of the tread portion 2 is largely controlled. Hence the shearing strain produced between the tread rubber 3 and the belt 5 at the stepping-in side and the kicking-out side of the tread portion 2 is considerably decreased. Even if deep cut damage arriving at the belt 5 is caused in the central region of the tread portion 2, therefore, the growth of separation failure from such a cut damage can be effectively prevented to improve the resistance to cut separation.

It is required to arrange the narrow-width rigidity reinforcing layer Br in the main cross belt layers other than the first belt layer 1b because when the tread portion 2 rides on projections having a tip shape of blunt weapon, a large tension is further applied to the belt layer 1B near to the carcass 4 at the riding position and there is caused a fear of cord breaking-up. Therefore, even if the layer Br is arranged outside the layer 1B, in order to maintain the high resistance to cord breaking-up in the riding on the projection considering that the tension of cords is high in the inflation under internal pressure, it is desirable that the diameter of the cord in the layer Br is made larger than that of the layer B arranged inward from the layer Br.

According to the second aspect of the invention, when the belt is comprised of four main cross belt layers 1B–4B having a width corresponding to 70–85% of the tread width Wt and two belt layers among these layers are narrow-width rigidity reinforcing layers Br having a width Wb corresponding to 50–60% of the maximum width Wb of the main cross belt layer. An inclination cord angle of 5°–15° with respect to the equatorial plane E and arranged as an innermost layer 1Br and in the main cross belt layers other than the layer 2B adjacent to the layer 1Br (4Br in the illustrated embodiment) as shown in FIGS. 3a and 3b, the circumferential tension at the central region of the belt 5 shown by dotted lines in FIG. 5 is further increased and hence the resistance to cut separation is further improved.

When the two narrow-width rigidity reinforcing layers Br are adjoined to each other and laminated one upon the other, since the inclination cord angle with the equatorial plane E is small in each layer, a large shearing strain is generated between the end portions of these layers Br during inflation under internal pressure and in the contact of the tread portion 2 with ground. Hence the other separation failure is apt to be caused between these end portions, so that it is required to avoid the adjacent lamination of the two narrow-width rigidity reinforcing layers. Moreover, the increase of cord tension at the narrow-width rigidity reinforcing layer in the riding on the projection is largely mitigated by arranging a pair of narrow-width rigidity reinforcing layers 1Br and 4Br because the increase of cord tension is dispersedly born by both the layers 1Br and 4Br, so that the fear of causing the cord breaking-up in the layer 1Br can be removed.

By arranging the narrow-width rigidity reinforcing layers Br having a high bending rigidity at the central region of the belt 5, the rigidity at both sides of the central region is largely decreased compared with the rigidity of the conventional belt 5' (see FIGS. 4a and 4b). The tread portion 2 provided with the belt 5 including the narrow-width rigidity reinforcing layers Br exhibits a behavior capable of easily deforming in the widthwise direction of the tread compared with the tread portion 2 provided with the conventional belt 5' when the tread portion 2 ride on the projections. This largely improves not only the EP property but also the cut resistance and resistance to cut penetration. Moreover, these properties can be further improved by disposing the protection belt layer Bp of high elongation steel cords outside the main cross belt layers.

When the inclination cord angle of the narrow-width rigidity reinforcing layer Br with respect to the equatorial plane E exceeds 15°, the improvement of circumferential tension at the central region of the belt 5 is insufficient. When it is less than 5°, separation failure is apt to be caused at the end portion of the narrow-width rigidity reinforcing layer Br even if the narrow-width rigidity reinforcing layers are not laminated in the adjacent relation. Further, the reason why the width Wr of the narrow-width rigidity reinforcing layer Br is restricted to a range of 50–60% of the maximum width Wb of the main cross belt layer in the belt 5 is due to the fact that the shearing strain causing the cut separation failure corresponds to the distribution of circumferential tension at a region corresponding to 50–60% of the maximum width Wb of the main cross belt layer as previously mentioned.

Moreover, separation failure not based on the cut damage is usually caused at the end portion of the wide-width belt layer in the belt 5. In the tires according to the invention, the resistance to such a separation can sufficiently be maintained as compared with the conventional tire even when the narrow-width rigidity reinforcing layer Br is arranged among the main cross belt layers in the belt.

The following examples are given in illustration of the invention and are not intended as limitations thereof.

(a) Radial tires for truck and bus (TBR)

There are provided three invention tires having a tire size of 275/80R22.5 in which a tire of Example 1 is a main part shown in FIG. 1a, and a tire of Example 2 is a main part shown in FIG. 2a, and a tire of Example 3 is a main part shown in FIG. 3a. In these tires, the tread width Wt is 210 mm, and the carcass 4 is a radial rubberized ply of steel cords, and steel cord used in each layer of the belt 5 has a structure of (3+9+15)×0.23 mm and a cord diameter of 1.4 mm. Moreover, there are provided tires of Conventional Example 1 and Comparative Example 1 having the same structure as in the example except for the structure of the belt 5' shown in FIG. 4a. The dimensions of the belt layers 1B–4B in the belts 5 and 5' are shown in Table 1 in which each of the belt layer 3B in Example 1, the belt layer 2B in Example 2 and the belt layers 1B and 4B in Example 3 is the narrow-width rigidity reinforcing layer Br. In Table 1, the term "width/angle" means width of the belt layer (mm)/ inclination cord angle (with respect to the equatorial plane), and symbols R and L appended before the angle mean arrangements of cord upward to the right and the left, respectively. Furthermore, the term "end count" means the number of cords to be embedded per 25 mm.

(b) Radial tires for construction vehicle (ORR)

There are three tires having a tire size of 37.00R57 in which a tire of Example 4 is a main part shown in FIG. 1b, and a tire of Example 5 is a main part shown in FIG. 2b, and a tire of Example 6 is a main part shown in FIG. 3b. In these tires, the tread width Wt is 840 mm, and the carcass 4 is a radial rubberized ply of steel cords, and steel cord used in each layer of the belt 5 is as follows:

Layers 4B, 3B: twisting structure of (3+9+15)×7×0.175 mm cord diameter of 3.2 mm Layers 2B, 1B: twisting structure of (3+9)×7×0.23 mm cord diameter of 2.8 mm Layer Bp: twisting structure of 3×7×0.23 mm cord diameter of 1.6 mm Moreover, there are provided tires of Conventional Example 2 and Comparative Example 2 having the same structure as in the example except for the structure of the belt 5' shown in FIG. 4b. The dimensions of the belt layers 1B–4B in the belts 5 and 5' are shown in Table 2 in which each of the belt layer 4B in Example 4, the belt layer 3B in Example 5 and the belt layers 1B and 4B in Example 6 is the narrow-width rigidity reinforcing layer Br. The terms "width/angle" and "end count" in Table 2 have the same meanings as in Table 1.

The resistance to cut separation and resistance to cut penetration are evaluated by the following methods with respect to these tires of Examples 1–6, Conventional Examples 1–2 and Comparative Examples 1–2.

Resistance to cut separation: A test tire previously provided at its widthwise central region of the tread with cut damage arriving at the belt 5, 5' is run on a drum under an air pressure (kgf/cm$^2$) and a load corresponding to maximum loading ability (kg) for a given time and thereafter a length of separation failure from the cut damage is measured.

Resistance to cut penetration: It is evaluated according to so-called plunger test. A plunger is a steel rod having a diameter of 38 mm for TBR tire or 90 mm for ORR tire and a semi-circular shape at its top is fixed vertically and the same test tire as mentioned above is contacted with the semi-circular top and pushed downward in the vertical direction, during which energy required for breaking the tire by the plunger (integral value of force F applied to the plunger and stroke S until the breakage) is measured.

The measured results are also shown in Tables 1 and 2. Each of both the properties is represented by an index value on the basis that each of Conventional Example 1 for TBR tire and Conventional Example 2 for ORR tire is 100. The larger the index value, the better the property.

Examples and Comparative Examples though the evaluation results are not shown in Tables 1 and 2.

As mentioned above, according to the invention, there can be provided heavy duty pneumatic radial tires capable of highly enhancing the resistance to cut separation and improving the resistance to cut penetration while sufficiently maintaining the separation resistance at the end of the belt and having a long service life.

What is claimed is:

1. A heavy duty pneumatic radial tire comprising; a radial carcass extending between a pair of bead cores for reinforcing sidewall portions and a tread portion, a belt reinforcing the tread portion at an outside of the carcass and comprised of plural steel cord layers, said belt having not less than three main cross belt layers, steel cords of said main cross belt layers being crossed with each other between adjacent belt layers, a maximum width in the main cross belt layers is within a range of 70–85% of a tread width of the tread portion, and a remaining belt layer other than a belt layer adjacent to the carcass among the above main cross belt layers is a narrow-width rigidity reinforcing layer having a

TABLE 1

|  |  | Conventional Example 1 | Comparative Example 1 | Example 1 | Example 2 | Example 3 |
| --- | --- | --- | --- | --- | --- | --- |
| 4B | width/angle | — | — | — | — | 95/R10° |
|  | end count | — | — | — | — | 9.3 |
| 3B | width/angle | 125/R21° | 125/R18° | 100/R12° | 125/R21° | 155/L20° |
|  | end count | 9.0 | 9.1 | 9.3 | 9.0 | 9.0 |
| 2B | width/angle | 155/L20° | 155/L18° | 155/L20° | 100/L12° | 175/R25° |
|  | end count | 9.0 | 9.1 | 9.0 | 9.3 | 8.5 |
| 1B | width/angle | 175/R25° | 175/R23° | 175/R25° | 175/R25° | 100/L12° |
|  | end count | 8.5 | 8.7 | 8.5 | 8.5 | 9.3 |
| Resistance to cut separation |  | 100 | 108 | 125 | 120 | 133 |
| Resistance to cut penetration |  | 100 | 88 | 113 | 108 | 118 |

TABLE 2

|  |  | Conventional Example 2 | Comparative Example 2 | Example 4 | Example 5 | Example 6 |
| --- | --- | --- | --- | --- | --- | --- |
| 4B | width/angle | 480/L22° | 480/L20° | 340/L11° | 480/L22° | 340/L9° |
|  | end count | 6.0 | 6.0 | 6.3 | 6.0 | 6.3 |
| 3B | width/angle | 550/R22° | 550/R18° | 550/R22° | 340/R11° | 550/R22° |
|  | end count | 6.0 | 6.1 | 6.0 | 6.3 | 6.0 |
| 2B | width/angle | 620/L22° | 620/L18° | 620/L22° | 620/L22° | 620/L22° |
|  | end count | 6.5 | 6.6 | 6.5 | 6.5 | 6.5 |
| 1B | width/angle | 560/R22° | 560/R20° | 560/R22° | 560/R22° | 360/R12° |
|  | end count | 6.5 | 6.5 | 6.5 | 6.5 | 6.7 |
| Resistance to cut separation |  | 100 | 110 | 130 | 118 | 135 |
| Resistance to cut penetration |  | 100 | 85 | 118 | 108 | 115 |

As seen from Tables 1 and 2, the tires of Examples 1–6 are very excellent in the resistance to cut separation and resistance to cut penetration as compared with the tires of Conventional Examples 1 and 2. On the contrary, the tires of Comparative Examples 1 and 2 largely lower the resistance to cut penetration, which sufficiently support the peculiar effect of the invention. Moreover, the resistance to separation at the end of the belt 5 in the tires of Examples 1–6 is substantially equal to that in the tires of Conventional width corresponding to 50–60% of the maximum width of the main cross belt layers and an inclination cord angle of 5°–15° with respect to an equatorial plane of the tire.

2. A heavy duty pneumatic radial tire according to claim 1, wherein the main cross belt layers other than the narrow-width rigidity reinforcing layer have an inclination cord angle of 18°–35° with respect to the equatorial plane of the tire.

3. A heavy duty pneumatic radial tire according to claim 1, wherein a protection belt layer is arranged on the main cross belt layer located outward in a radial direction of the tire.

4. A heavy duty pneumatic radial tire comprising; a radial carcass extending between a pair of bead cores for reinforcing sidewall portions and a tread portion, a belt reinforcing the tread portion at an outside of the carcass and comprised of plural steel cord layers, said belt having not less than four main cross belt layers, steel cords of said main cross belt layers being crossed with each other between adjacent belt layers, a maximum width in the main cross belt layers is within a range of 70–85% of a tread width of the tread portion, and each of a belt layer adjacent to the carcass and a remaining belt layer other than a belt layer facing to the belt layer adjacent to the carcass among the above main cross belt layers is a narrow-width rigidity reinforcing layer having a width corresponding to 50–60% of the maximum width of the main cross belt layers and an inclination cord angle of 5°–15° with respect to an equatorial plane of the tire.

5. A heavy duty pneumatic radial tire according to claim 4, wherein the main cross belt layers other than the narrow-width rigidity reinforcing layers have an inclination cord angle of 18°–35° with respect to the equatorial plane of the tire.

6. A heavy duty pneumatic radial tire according to claim 2, wherein a protection belt layer is arranged on the main cross belt layer located outward in a radial direction of the tire.

* * * * *